United States Patent [19]

Vetter

[11] Patent Number: 4,950,009
[45] Date of Patent: Aug. 21, 1990

[54] SAFETY STEP BUMPER ASSEMBLY
[76] Inventor: Robert W. Vetter, Patchogue, N.Y.
[21] Appl. No.: 400,366
[22] Filed: Aug. 30, 1989
[51] Int. Cl.[5] .............................................. B60R 19/48
[52] U.S. Cl. .................................... 293/117; 293/135
[58] Field of Search ................. 293/117, 135, 137, 155

[56] References Cited

U.S. PATENT DOCUMENTS

| | | | |
|---|---|---|---|
| 921,443 | 5/1909 | Noble . | |
| 1,805,414 | 5/1931 | Ohlendorf . | |
| 1,855,977 | 4/1932 | Llobet . | |
| 2,029,824 | 2/1936 | LaPointe . | |
| 2,035,809 | 3/1936 | Hingst | 293/55 |
| 2,058,283 | 10/1936 | Wolff | 293/55 |
| 2,159,651 | 5/1939 | Brockett | 293/55 |
| 2,306,994 | 12/1942 | Martin | 293/117 |
| 3,120,973 | 2/1964 | Ramsey | 293/84 |
| 3,284,100 | 11/1966 | Goff | 293/137 X |
| 3,311,397 | 3/1967 | Ramsey | 293/84 |
| 3,459,004 | 8/1969 | Morini | 61/48 |
| 3,499,661 | 3/1970 | Rowe | 293/135 X |
| 3,702,202 | 11/1972 | Rumsey | 293/89 |
| 3,834,686 | 9/1974 | Moritz et al. | 267/116 |
| 3,927,907 | 12/1975 | Binlek | 293/135 |
| 4,014,582 | 3/1977 | MacKenzie | 293/135 X |
| 4,182,529 | 1/1980 | Taylor | 293/155 X |

FOREIGN PATENT DOCUMENTS

| | | | |
|---|---|---|---|
| 19940 | 10/1901 | United Kingdom | 293/137 |
| 295464 | 8/1928 | United Kingdom | 293/135 |
| 431537 | 3/1948 | Italy | 293/135 |

Primary Examiner—Margaret A. Focarino
Assistant Examiner—Gary C. Hoge
Attorney, Agent, or Firm—Fish & Richardson

[57] ABSTRACT

A safety step bumper assembly for a vehicle includes a frame having a base member constructed for fixed attachment to the chassis of a vehicle, an elongated step bumper member mounted upon the frame in a predetermined axial position and a predetermined rotational position, and a pin joining the step bumper member and frame in pivotable relationship. The step bumper member pivots, relative to the frame, from, and returns to, the predetermined rotational position. The safety step bumper assembly defines a slot, and the pin member engages in the slot and moves therein between a first pin position spaced from the chassis, with the step bumper member in the predetermined axial position, and a second pin position relatively closer to the chassis. The assembly also includes, e.g. a leaf spring for biasing the step bumper member toward the predetermined axial and rotational position. The safety step bumper assembly is thereby adapted for pivoting and sliding movement of the step bumper member, relative to the fixed frame on the chassis, from the predetermined axial and rotational positions, in a manner to adjust to otherwise destructive forces applied to the step bumper member by engagement upon a dock or other obstruction.

6 Claims, 4 Drawing Sheets

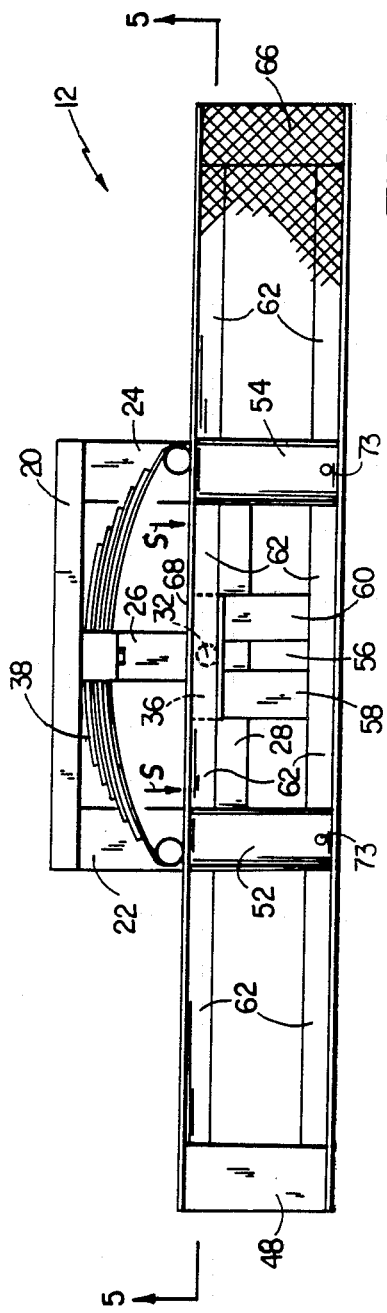
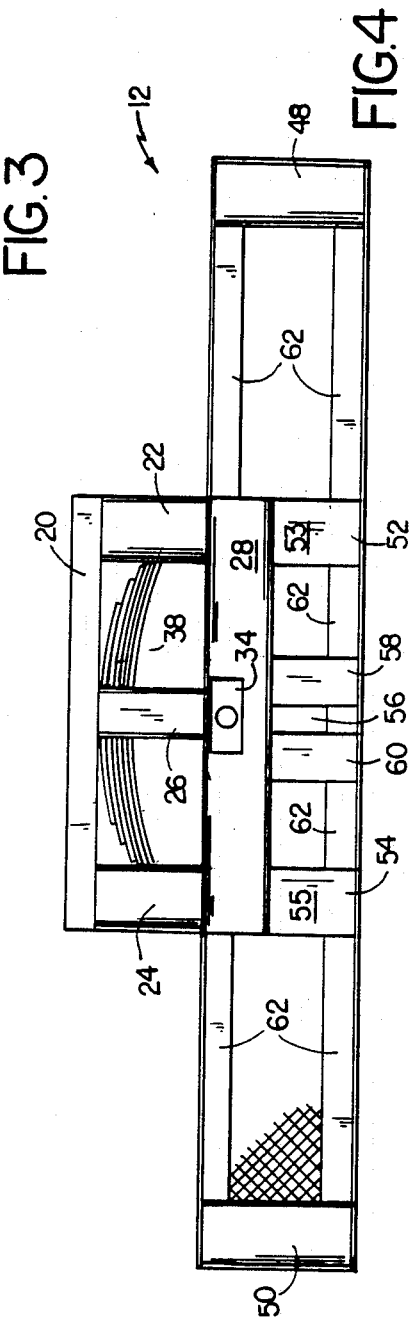
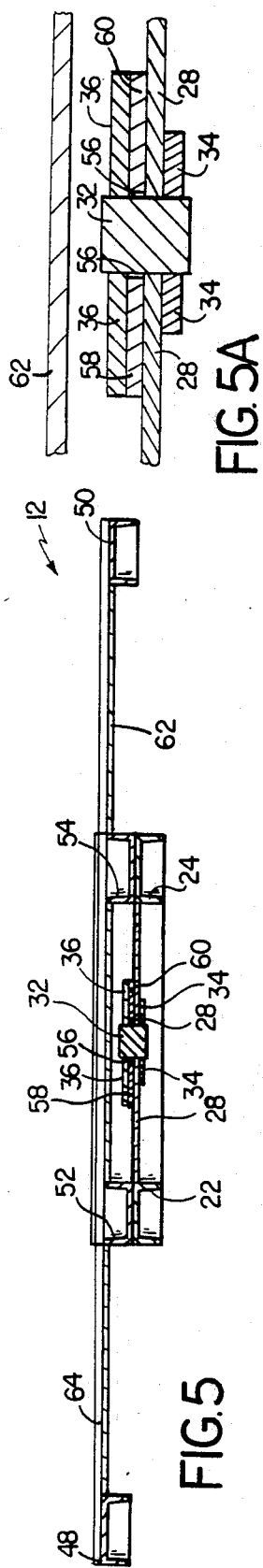

SAFETY STEP BUMPER ASSEMBLY

The invention relates to vehicle bumpers and fenders.

Safety bumpers are employed to reduce the amount of damage that might otherwise occur upon contact of a vehicle equipped with such a bumper against an obstacle. Typically the bumper is formed of resilient material, or is mounted on the vehicle by means, e.g., of springs or shock absorbers. For example, Ohlendorf U.S. Pat. No. 1,805, 414; Llobet U.S. Pat. No. 1,855,977 and Hingst U.S. Pat. No. 2,035,809 describe bumpers formed in part of spring bars. La Pointe U.S. Pat. No. 2,029,824 describes a bumper including a tension spring, while Ramsey U.S. Pat. No. 3,120,973 and U.S. Pat. No. 3,311,397 describe vehicle bumpers employing springs resilient under tension and under compression. Moritz et al. U.S. Pat. No. 3,834,686 describes a hydraulic impact absorbing bumper; Wolff U.S. Pat. No. 2,058,283 also describes a bumper including shock-absorbing elements. Brockett U.S. Pat. No. 2,159,651 describes a car bumper attached to the vehicle wheels in a manner to cause the vehicle to steer away upon contact.

SUMMARY OF THE INVENTION

According to the invention, a safety step bumper assembly for a vehicle comprises a frame having a base member constructed for fixed attachment of the frame to the chassis of a vehicle, an elongated step bumper member mounted upon the frame in a predetermined axial position and a predetermined rotational position, a pin member joining the step bumper member and the frame in pivotable relationship, the step bumper member adapted for pivoting movement, relative to the frame, from the predetermined rotational position and for return thereto, the safety step bumper assembly defining a slot, and the pin member engaged in the slot and movable therein between a first pin position spaced from the chassis, with the step bumper member in predetermined axial position, and a second pin position relatively closer to the chassis, and means for biasing the step bumper member toward the predetermined axial and rotational positions, whereby the safety step bumper assembly is adapted for pivoting and sliding movement of the step bumper member, relative to the fixed frame on the chassis, from the predetermined axial and rotational positions, in a manner to adjust to otherwise destructive forces applied to the step bumper member by engagement upon a dock or other obstruction.

In preferred embodiments, the bumper further comprises a stop member adapted to limit movement of the step bumper member toward the first position under influence of the means for biasing, preferably the stop member comprises an elongated element disposed in fixed relationship with the frame, the stop member and the means for biasing cooperatively adapted to return the safety step bumper assembly toward the predetermined axial and rotation positions upon relaxation of the otherwise destructive force, more preferably the stop member is fixedly mounted upon the pin member; the pin member is fixedly mounted upon the frame, and the slot is defined by the step bumper member; the means for biasing the step bumper member toward the first position away from the chassis is mounted on the frame; and the means for biasing comprises a leaf spring.

These and other features and advantages of the invention will be seen from the following description of a presently preferred embodiment, and from the claims.

PREFERRED EMBODIMENT

We first briefly describe the drawings:

FIG. 3 is a top plan view of a safety step bumper assembly of the invention;

FIG. 4 is a bottom plan view of the bumper assembly of FIG. 3;

FIG. 5 is a front section view of the bumper assembly of the invention taken at the line 5—5 of FIG. 3, while FIG. 5A is a similar view, taken on an enlarged scale, of the region of attachment of safety step bumper assembly frame and bumper;

Figure 1:
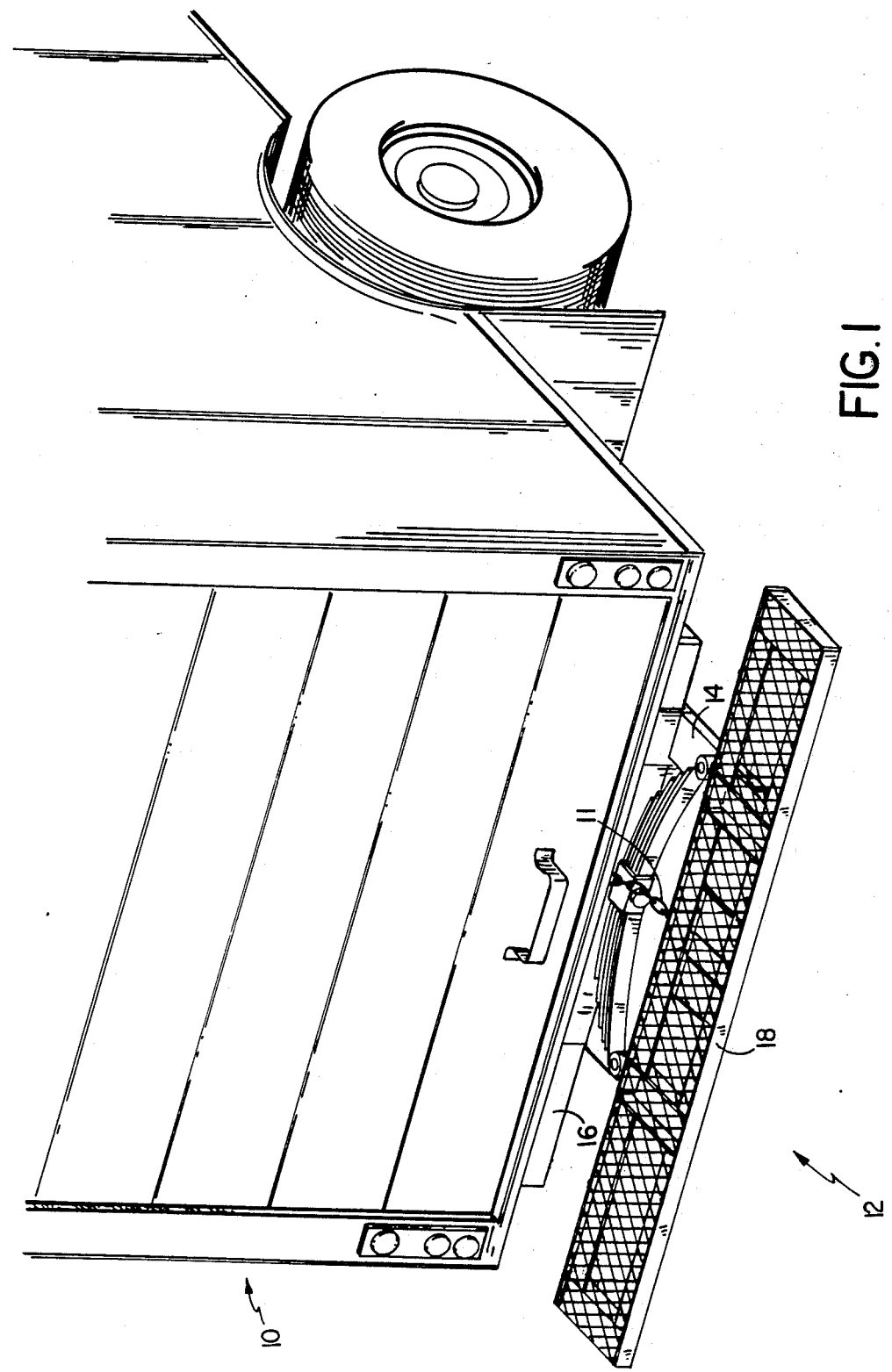
FIG. 1 is a perspective view of a vehicle equipped with a safety step bumper assembly of the invention.

Referring to FIG. 1, a roll-door delivery truck 10 is equipped with a safety step bumper assembly 12 of the invention. The bumper assembly consists of a frame 14 fixedly mounted, e.g. by welding, to the vehicle chassis 16, and an elongated step bumper member 18 mounted upon the frame in a position of predetermined axial and rotational position, as shown.

Figure 2:
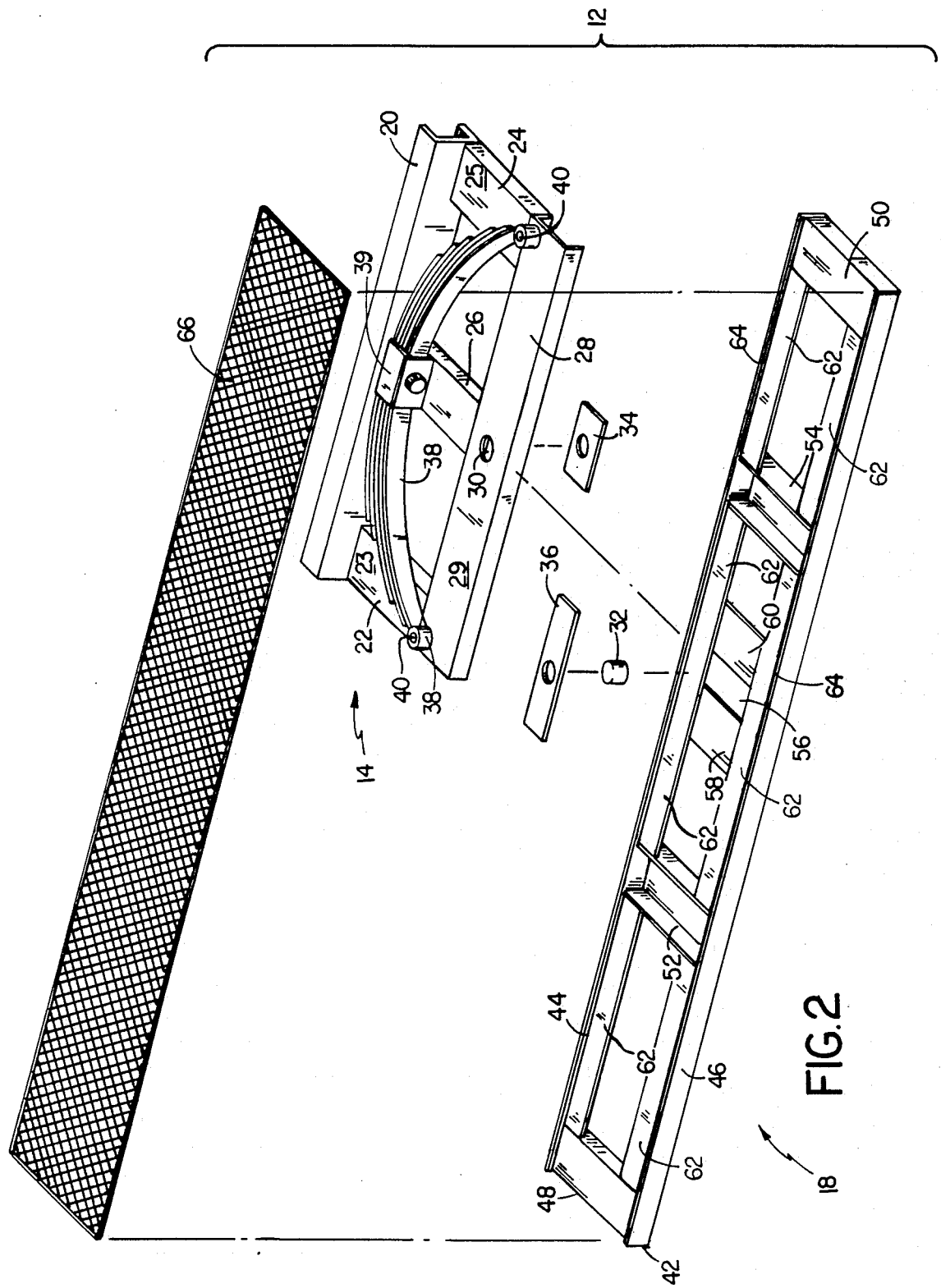
FIG. 2 is an exploded perspective view of a safety bumper assembly of the invention.

Referring also to FIG. 2, the frame 14 consists of base 20, e.g. 4 inch channel by 28 inches long, 5.4 pounds per linear foot, with slide rails 22, 24 and cross piece 26, also 4 inch channel by 11 inches long, and face member 28, e.g. 4 inch channel by 20 inches long, all joined by welding. The face member 28 defines an opening 30 at the center of the stationary frame 14. A pivot pin 32, e.g. 2 inch round stock by 2 inches long, is fixedly attached to the face member, e.g. by welding, and supported by reinforcement plate 34, e.g. $\frac{3}{8}$ by 3—$\frac{1}{2}$ inches by 4 inches, attached to the undersurface of the face member 28. The pivot pin 32 extends upwardly from the slide surface 29 of the face member 28, and a wear plate or stop member 36, e.g. $\frac{3}{8}$ inch by 3 inches by 8 inches, is fixedly mounted thereto and engages the upper surfaces of plates 58, 60 to secure the bumper member 18 to the frame 14. The frame 14 further houses a leaf spring 38, e.g., 1—$\frac{3}{4}$ inches wide and measuring 26 inches between eyelets 40, with six leaves and a rating of 4,500 pounds. The spring 38 is secured to the frame 14 by top plate 39. A safety chain 11 (FIG. 1), extending between frame and bumper, is welded to top plate 39 and bumper rear side bar 44 (described below).

The step bumper member 18 has an outer frame 42 formed of side bars 44, 46, e.g. $\frac{3}{8}$ inch by 2 inch by 6 feet flat bar stock, joined by outer rails 48, 50 and inner rails 52, 54, e.g. 4 inch channel by 9-$\frac{3}{4}$ inches long. The outer rails are disposed flat side up; the inner rails are inverted with the flat surfaces 53, 55 (FIG. 4) disposed in sliding engagement with the flat surfaces 23, 25, 29 of frame slide rails 24, 26 and face member 28. (Holes 73 (FIG. 3) provide drainage from the cavities of inner rails 52, 54.) A slot 56, through which pivot pin 32 is disposed to extend, is defined by bars 58, 60, e.g. $\frac{3}{8}$ inch by 3 inches by 9—$\frac{3}{4}$ inches. Stiffeners 62 are welded about the inner periphery of the step bumper frame 42. The rails and stiffeners are recessed from the upper edges 64 of the side bars 62 to provide support for grid 66, e.g. ¾ inch raised expanded wire mesh selected to prevent accumulation of ice or snow on the step surface.

As shown in the drawings, the elongated bumper member 18 is disposed upon the frame 14, with surfaces 53, 55 of the bumper engaged upon surfaces 23, 25, 29 of the slide rails 22, 24 and face member 28, and pivot pin 32 extending through the slot 56, topped by wear plate 36. The eyelets 40 of leaf spring 38 bear against the inner surface 68 of bumper member 18, providing a rearwardly directed bias (arrows S), to cause the bumper member 18 to bear upon the wear plate 36, which in turn is fixedly oriented to square the bumper member 18 with the frame 14.

The bumper member 18 is thereby free for rotation about the pin 32 in response to a resisting force upon the bumper exceeding the biasing force of the spring 38, and further is capable of axial movement with the pin 32 disposed in the slot 56, again in response to resisting force upon the bumper member exceeding the force of the spring. The leaf spring 38 in turn exerts a resilient return force upon the bumper member to return it into engagement upon the pivot pin 32 and wear plate 36, the fixed orientation of the pin and plate causing the bumper to return to a predetermined axial and rotational position when the resisting force is removed.

Figure 6:
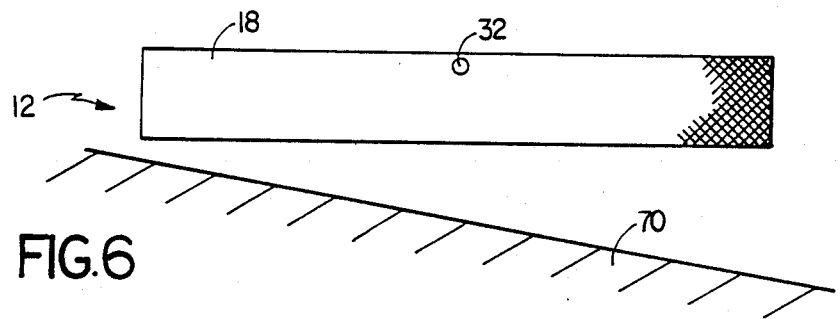
FIGS. 6, 6A and 6B are somewhat diagrammatic plan views showing operation of a safety step bumper assembly in engagement against a misaligned loading dock.
Figure 6A:
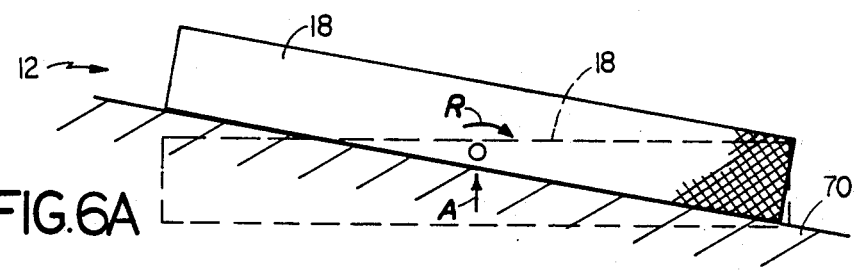
Figure 6B:
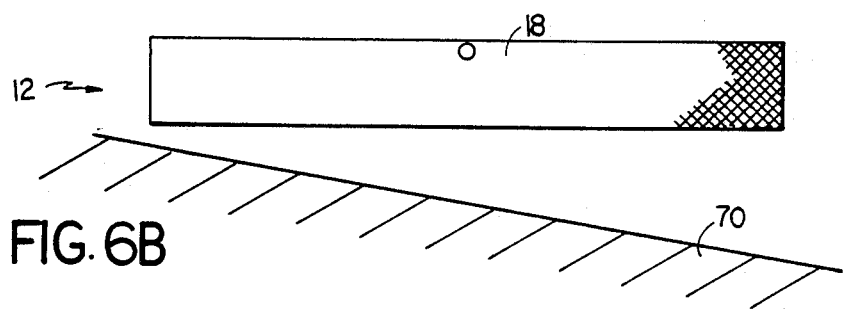

We refer now to FIGS. 6 et seq. In FIG. 6, a vehicle (not shown) with a safety step bumper assembly 12 of the invention approaches an object, e.g. a loading dock 70, out of square. In FIG. 6A, the bumper assembly of the invention has adjusted to accommodate the out of square orientation of the bumper and dock to avoid damage, e.g. to the bumper, to the vehicle and to the dock, by allowing the bumper to rotate (arrow R) about pin 32, and also to move axially (arrow A) relative to the pin fixed to the bumper assembly frame. In FIG. 6B, the vehicle has pulled away from the dock 70, and the bumper has been returned to the predetermined axial and rotational position by resilient action of the leaf spring 38 to return the bumper to engagement with the pivot pin 32 and wear plate 36.

Figure 7:
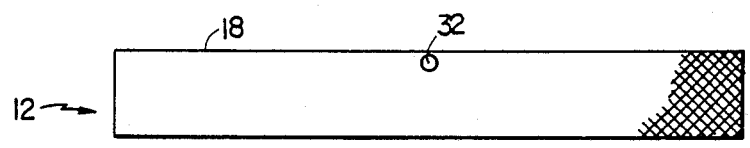
FIGS. 7, 7A and 7B are similar views of a safety step bumper assembly engaged with otherwise destructive force against another obstruction.
Figure 7A:
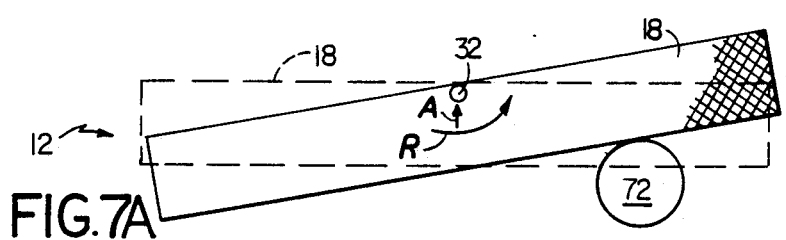
Figure 7B:
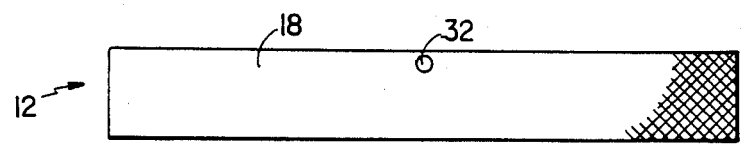

In FIGS. 7 et seq., a vehicle (again not shown) equipped with a safety step bumper assembly 12 of the invention collides with an obstruction, e.g. post 72. In FIG. 7, the bumper approaches post 72. In FIG. 7A, the bumper is engaged upon the post, and the safety step bumper assembly allows the bumper 18 to rotate and move axially relative to pivot pin 32 in order to reduce damage to the bumper, and to the vehicle and post. In FIG. 7B, the vehicle has pulled away from the post, and the bumper is returned to the predetermined position, as described above.

The safety step bumper assembly may also adjust to resistance forces requiring only axial or rotational motion.

Other embodiments are within the following claims. For example, the bumper assembly of the invention may be formed of any suitable material such as metal or plastic, and may be formed of multiple components joined by any suitable means, e.g. welding or adhesive, or may be formed integrally, e.g. by molding. The materials and dimensions described are provided only by way of example.

I claim:

1. A safety step bumper assembly for a vehicle comprising:

a frame having a base member constructed for fixed attachment of said frame to the chassis of a vehicle, an elongated step bumper member mounted upon said frame in a predetermined axial position and a predetermined rotational position, a pin member joining said step bumper member and said frame in pivotable relationship, said step bumper member adapted for pivoting movement, relative to said frame, from said predetermined rotational position and for return thereto, said safety step bumper assembly defining a slot, and said pin member engaged in said slot and movable therein between a first pin position with said step bumper member spaced from said chassis and in said predetermined axial position, and a second pin position with said step bumper member relatively closer to said chassis, means for biasing said step bumper member toward said predetermined axial and rotational position, and a stop member adapted to limit movement of said step bumper member for return of said bumper member toward its said predetermined axial and rotational positions under influence of said means for biasing, whereby said safety step bumper assembly is adapted for pivoting and sliding movement of said step bumper member, relative to the fixed frame on the chassis, from said predetermined axial and rotational positions, in a manner to adjust to otherwise destructive forces applied to said step bumper member by engagement upon a dock or other obstruction.

2. The safety step bumper assembly of claim 1 wherein said stop member comprises an elongated element disposed in fixed relationship with said frame, said stop member and said means for biasing cooperatively adapted to return said safety step bumper assembly toward said predetermined axial and rotation positions upon relaxation of said otherwise destructive force.

3. The safety step bumper assembly of claim 2 wherein said stop member is fixedly mounted upon said pin member.

4. The safety step bumper assembly of claim 1 wherein said pin member is fixedly mounted upon said frame, and said slot is defined by said step bumper member.

5. The safety step bumper assembly of claim 1 wherein said means for biasing said step bumper member toward said first position away from said chassis is mounted on said frame.

6. The safety step bumper assembly of claim 1 or 5 wherein said means for biasing comprises a leaf spring.

* * * * *